June 14, 1960  W. C. LAMPHIER  2,941,024
CAPACITOR END SEAL
Filed Feb. 15, 1955

INVENTOR.
WALTER C. LAMPHIER
BY Connolly and Hutz
HIS ATTORNEYS

United States Patent Office 2,941,024
Patented June 14, 1960

---

2,941,024

CAPACITOR END SEAL

Walter C. Lamphier, Williamstown, Mass., assignor to Sprague Electric Company, North Adams, Mass., a corporation of Massachusetts Filed Feb. 15, 1955, Ser. No. 488,329

7 Claims. (Cl. 174—52)

The present invention relates to a new and improved type of capacitor end seal and more particularly to a resin-bonded floating disc construction.

For many years small electrostatic capacitors have been produced utilizing an external metal can to protect the capacitance unit itself. Constructions of this category have proved extremely advantageous because these capacitors are not easily damaged in handling or use. Unfortunately, however, such units have not had the desired tight sealing characteristics unless the cans have their open ends closed by an expensive glass-to-metal seal or the like. Prior art resin end seals have not been able to withstand repeated cycling between temperatures of −55° C. and at least 100° C. This cycling imposes such strains and stresses on the known types of resinous seals that fracture or failure occurs sometimes in the very first cycle.

Figure 1:
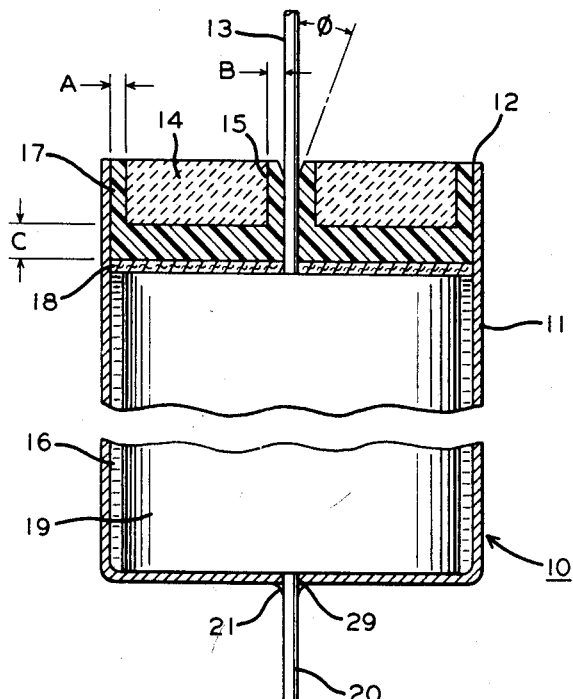
Figure 2:
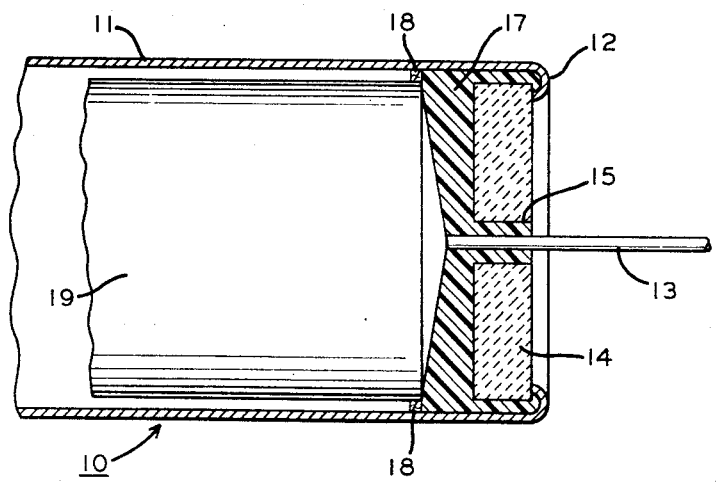

It is an object of the present invention to produce a new type of capacitance assembly sealed within a metallic protective container and which can withstand extreme temperature variations. A further object of the invention is to produce a new type of resin seal which will protect capacitors against thermal as well as mechanical shocks, extremely well. Further objects of the invention, as well as the advantages thereof, will be apparent from the body of this specification, the appended claims, and the accompanying drawings in which:

Fig. 1 is a sectional view of a capacitor assembly including the seal of this invention; and Fig. 2 is a sectional view similar to Fig. 1 showing a modified form of seal according to the present invention.

Briefly, the above objects are achieved by an end seal in the form of a ceramic washer floating in a plug of an epoxy resin. The resin may be filled with up to about 75% (based on total weight) of finely ground inert materials having a coefficient of expansion between 5 and 20 parts per million per degree centigrade. For example, finely ground silica used in amounts of from $\frac{1}{3}$ to $\frac{2}{3}$ the total weight of filled resin significantly improves the life of the end seals of the invention, although as little as 10% is very helpful.

For operation at exceptionally high temperatures the above construction is modified by turning in the wall at the open end of the metallic can at an angle substantially 180° against the outer face of the washer as shown in Fig. 2.

Resins of the epoxy type are well known in the art, some being disclosed in the Buck et al. U.S. Patent No. 2,569,920, the Wyles Patent No. 2,528,934, the Greenlee Patent No. 2,542,664, the Bixler Patent No. 2,512,996, the Bender et al. Patent No. 2,506,486, the Greenlee Patents Nos. 2,510,885 and 2,510,886 and the Newey et al. Patent No. 2,553,718. Also see the Narracott article in British Plastics, October 1951, pages 341 through 345.

The invention will be best understood with reference to Fig. 1 wherein there is shown a capacitor assembly 10 in which there is employed a cylindrical metallic container 11 housing a wound capacitance section or unit 19, and having an open end 12 through which terminal lead 13 of the capacitor projects. Around the lead 13 is placed a filled epoxy resin plug 17, and in the resin is positioned a ceramic washer 14. If desired a second washer 18 of fibrous material such as paper may be used to keep the epoxy resin from contact with the capacitor assembly 10 and thereby avoid any interaction between them. The can has a bottom hole 29 through which another terminal lead 20 of the enclosed capacitor projects. The hole 29 is closed by means of solder 21, or other suitable alloy, to hermetically seal the unit. Before sealing, the unit can be impregnated with a liquid dielectric 16 that enters through hole 29 and fills all pores and voids as well as the space between the container 11 and the capacitor.

Where it is desired to have neither terminal of the electrical component grounded to the container, the tube 11 can be open at both ends, and each end can be sealed with the end seal of the invention. This type of construction is preferably used with a section that is not to be impregnated, or is impregnated before insertion in the housing. In this way it is not necessary to provide an additional impregnation opening in the housing.

It is also preferred that where a lead emerges from the resin the resin surface be shaped to define a lead-flexing angle of from about 15 to 30°. This angle, indicated at $\phi$, is the angle included between the lead 13 and the resin 17.

The container 11 should have a wall thickness no greater than about 0.1 inch and where it has an inner diameter of less than about $\frac{3}{4}$ inch, the wall thickness should be not over 0.02 inch. The last-mentioned wall thickness is suitable regardless of the container diameter. For best results the central opening 15 of the washer 14 should be between about $\frac{1}{25}$ to about $\frac{1}{8}$ inch in diameter, the spaces A, B between the outside of the washer and the inside of the can, and between the edge of the washer opening and the surface of lead 13, each about 0.01 to about 0.05 inches, the thickness C of resin beneath the washer, between $\frac{3}{64}$ and $\frac{3}{32}$ inch.

Although very effective sealing can be obtained with containers made of unplated brass, aluminum, steel, zinc, etc., outstanding seals are produced when tin-plated brass is used, particularly if the tin is electroplated rather than hot dipped. A tin plating, either electrolytic or hot dipped, on the lead is also helpful.

As an example of the present invention but without limiting its scope, a capacitor section made of convolutely wound ribbons of aluminum foil and paper, with a margin of the respective foils projecting from opposite ends of the winding, had lead wires of dip-tinned copper 0.02 inch in diameter separately soldered to the separate extensions. The section, wound to an outer diameter of $\frac{9}{64}$ inch, was placed in a cylindrical brass can open at one end and having an outer diameter of 0.172 inch. The brass had an electrolytically deposited tin plating $\frac{1}{100}$ of a mil thick and the overall wall thickness of 0.01 inch. The closed end of the container had a central opening 0.04 inch in diameter and through this opening one of the lead wires was passed.

A cement was made up of 60 parts by weight powdered silica passing through a 300 mesh screen, two parts by weight of dimethylene triamine, and 30 parts by weight of the liquid condensation product of 4 mols of diphenlolpropane with 5 mols of epichlorohydrin in the presence of an excess of 10% aqueous NaOH. The cement was placed in the open end of the can which projected 0.15 inch beyond the end of the wound section.

A steatite washer having an outer diameter of 0.13 inch, an inner diameter of 0.05 inch, and an axial thickness of 0.078 inch, was slipped over the lead protruding from the open end and forced into the cement until its outer surface was flush with the edge of the can. Any excess cement squeezed out by this operation was wiped off and the assembly permitted to stand at room temperature for one hour. A sleeve having a tapered nose was then slid over the same protruding lead and pressed against the cement at the base of the lead to shape it into a conical recess having an angle $\phi$ of 20°. The sleeve was then withdrawn and the capacitor assembly cured at 75° C. for 17 hours.

Where it is desired to use less filler so as to more closely achieve the thermal coefficient of expansion of the particular metal container, a thickening agent is extremely useful. For example, with the epoxyline resin of the foregoing example which has a viscosity of about 16,000 centipoises at 25° C. and using equal weights of resin and silica filler, one to two percent by weight of powdered bentonite, increases the overall viscosity to one suitable for use. The viscosity must be such that little, if any, flow occurs during curring period, after which the cement has thermoset characteristics.

The assembly was then impregnated through the small opening in the closed end of the can by placing it in a highly evacuated space, submerged while evacuated under mineral oil, and the vacuum broken to cause the mineral oil to be sucked into the can through the small opening. The evacuation and impregnation step was repeated, after which the assembly was heated to 125° C., its surface wiped free of excess impregnant and the small opening sealed with the solder around the lead that projects through it.

The resulting assembly satisfactorily withstands as many as 100 thermal cycles of cooling to $-55°$ C. and heating to 100° C., without apparent change. In fact, the unit can be taken directly from a Dry Ice bath held at $-55°$ C. and immediately dropped into boiling water without damaging the seal or any other portion of the assembly. The same type of unit with the washer omitted and a uniform mass of resin sealing the open end of the can will invariably show a fracture of the resin upon such treatment.

The above desirable behavior is also obtained with other epoxy resins such as those described in the above-identified patents, as well as with washers of other ceramic materials such as glass, marble, porcelain, quartz, slate and sandstone. Furthermore, the finely divided silica can be replaced by other materials having the above-described thermal coefficients of expansion. Examples of such other materials include slate, alundum, magnesium oxide and mica. The filled resin should have a thermal coefficient of expansion less than about 35 times $10^{-6}$ per ° C. and preferably to be substantially that of the metallic container.

Fig. 2 shows a modified construction of the seal of the present invention. This construction can be identical with the construction of Fig. 1 except that the open edge 12 of the container 11 is turned back 180° so that it rests against the exposed face of the washer 14. The diameter of the bend, measured at the convex surface of the bend, should preferably be between about $\frac{1}{16}$ to about $\frac{1}{8}''$. The other corresponding elements in the construction of Fig. 2 are identified by reference characters identical with those used in connection with Fig. 1. As shown, the epoxy resin can be extended into the hollow formed by the turned in edge 12. The construction of Fig. 2 will withstand thermal cycling between temperatures of $-55°$ C. and $+250°$ C.

Where the capacitor section does not have a flat edge at the seal, the preferred dimension C is measured from the periphery (18 in Fig. 2) rather than the central portion of the capacitor. The highly effective sealing of the present invention can be used with capacitors made by other techniques. Convolutely wound foils can for example be arranged so they do not project from the edges of the winding, and can have terminals in the form of tabs or short sections of foil merely inserted in the windings without soldering, and projecting out from the same or different edges. Instead of having convolutely wound foils, the electrodes can be in the form of metallized layers on convolutely wound ribbons of paper or other support. Other constructions can also be fitted with the above seals. The seals are especially useful with capacitors by reason of the peculiar sensitivity of the capacitors to moisture as well as to exposure.

The assemblies of the present invention can be unimpregnated, as for example where they are intended for operation at relatively low potentials. On the other hand, they can be impregnated with any dielectric impregnant in place of the mineral oil referred to above. Equally good results are obtained with halogenated hydrocarbons such as chlorinated diphenyl and chlorinated naphthalene, castor oil, polybutadiene, etc. The impregnant can either be arranged to remain liquid, or to become gelled or solidified, and the solidification can be purely physical or can be the result of a polymerization or cross-linking action. Mineral oil can, for example, have dissolved in it 20% of polyethylene (molecular weight 2,100) by weight and the resulting solution used for impregnation at a temperature of about 100° C. Upon cooling the impregnant will become gelled and will show no tendency to leak out.

The preferred ranges of materials and dimensions given above provide the most desirable form of seals in accordance with the present invention. However, good seals are also produced with the resin of the present invention, where the specific dimensions are not adhered to. The presence of the floating washer makes a striking improvement in the seal even where the dimensions A and B are as little as one or two mils or as large as $\frac{1}{10}$ of an inch, and the dimension C as large as $\frac{2}{10}$ of an inch.

As many apparently widely different embodiments of this invention may be made without departing from the spirit and scope hereof, it is to be understood that the invention is not limited to the specific embodiments hereof except as defined in the appended claims. By way of example, the improved thermal characteristics will be obtained if the metallic container is in the form of a tube that is either circular or non-circular in cross-section. It can, for example, be square, elliptical, triangular or polygonal in cross-section. The floating washer can also have any of these shapes. Fruthermore, a circular washer will operate satisfactorily with tubes that are non-circular in cross-section, and a circular tube will also be suitable for use with washers having any of the above non-circular shapes.

This application is in part a continuation of application Serial No. 358,150, filed May 28, 1953 and later abandoned.

What is claimed is:

1. An end seal primarily useful for hermetically sealing an electrostatic capacitor within a metallic container comprising a cylindrical metal container having an open end, an electrical capacitor positioned within said container, an annular ceramic washer positioned in said container between said electrical capacitor, and said open end, a terminal lead of the capacitor extending through said open end, a central opening formed through said washer of substantially larger diameter than said lead and receiving said lead, said terminal lead projecting through the central opening of said washer, a filled epoxy resin substantially completely filling the end volume of said container defined by said cylinder wall and the end of said electrical capacitor and filling said central opening surrounding said terminal lead, said resin adherent to said terminal lead, the inner surface of said cylinder wall and said washer in a manner to maintain aforesaid elements in fixed relationship.

2. The capacitor of claim 1 in which said resin is filled with from about ⅓ to about ⅔ by weight of powered silica.

3. An electrical capacitor end seal comprising a tubular metal container surrounding the end of said capacitor, said container having an open end and a terminal lead for said capacitor projecting out through said end, a ceramic washer positioned in said container around said lead between said electrical capacitor end and said container end, a central opening formed through said washer of substantially greater diameter than said lead and receiving said lead, said washer being spaced from the lead, capacitor, and the container wall, an in situ cured epoxy resin containing from ⅓ to 3 times its weight of a finely divided filler having a thermal expansion of from about 5 to about 20 parts per million per degree centigrade, said resin filling said central opening and surrounding said lead and filling the spaces at said container end and adhering to said terminal lead, said cylinder wall and said annular washer in a manner to maintain all these elements in fixed relationship, the spacing of the washer from the lead and from the inner face of the tube being between 0.01 and 0.05 inch.

4. A capacitor end seal as claimed in claim 1 having a conical recess in the outer surface of the epoxy resin filling said central opening at the point of emergence of the lead from the surrounding epoxy resin, said resin surface being shaped to define a lead flexing annulus.

5. The combination of claim 1 in which said open end is rolled inwardly substantially 180° against said annular ceramic washer.

6. The combination of claim 1 in which said container has an inner diameter no greater than one inch and said annular ceramic washer has an outside diameter of from about 1/32 to about 1/16 inch less than said inner diameter of said container.

7. The combination of claim 1 in which said annular ceramic washer has a temperature coefficient of expansion substantially that of said container.

References Cited in the file of this patent
UNITED STATES PATENTS

| | | |
|---|---|---|
| 2,004,647 | Beer et al. | June 11, 1935 |
| 2,596,134 | Dorst | May 13, 1952 |
| 2,611,793 | Simpson | Sept. 23, 1952 |
| 2,636,073 | Clarke | Apr. 21, 1953 |
| 2,706,798 | Kodama | Apr. 19, 1955 |
| 2,790,941 | Dawson | Apr. 30, 1957 |
| 2,802,896 | Tierman et al. | Aug. 13, 1957 |

OTHER REFERENCES

"Electrical Manufacturing," September 1952 (pages 138 cited).

Proceedings of the Institute of Electrical Engineers, Part 3, January 1950, pages 56–64.

The Rubber and Plastic Age, vol. 35, February 1954, pages 84–87.

UNITED STATES PATENT OFFICE

CERTIFICATE OF CORRECTION

Patent No. 2,941,024  June 14, 1960

Walter C. Lamphier

It is hereby certified that error appears in the printed specification of the above numbered patent requiring correction and that the said Letters Patent should read as corrected below.

Column 3, line 23, for "curring" read -- curing --; column 5, line 25, after "inch" and before the period insert -- , the spacing of the washer from the adjacent end of the capacitor being between 3/64 and 3/32 inch, and the wall thickness of the tube being not more than 0.02 inch --.

Signed and sealed this 15th day of November 1960.

(SEAL)
Attest:

KARL H. AXLINE
Attesting Officer

ROBERT C. WATSON
Commissioner of Patents